(12) United States Patent
Harris et al.

(10) Patent No.: US 8,487,963 B1
(45) Date of Patent: Jul. 16, 2013

(54) PREVIEW REPRESENTATION OF PIXELS EFFECTED BY A BRUSH TIP AREA

(75) Inventors: Jerry Harris, Newberry, FL (US); John W. Worthington, Minnetonka, MN (US)

(73) Assignee: Adobe Systems Incorporated, San Jose, CA (US)

( * ) Notice: Subject to any disclaimer, the term of this patent is extended or adjusted under 35 U.S.C. 154(b) by 1022 days.

(21) Appl. No.: 12/130,992

(22) Filed: May 30, 2008

(51) Int. Cl.
*G09G 5/00* (2006.01)

(52) U.S. Cl.
USPC .......................................... 345/643; 345/619

(58) Field of Classification Search
USPC .................................................. 345/619, 643
See application file for complete search history.

(56) References Cited

U.S. PATENT DOCUMENTS

| | | | |
|---|---|---|---|
| 4,658,247 A | 4/1987 | Gharachorloo | |
| 4,888,812 A | 12/1989 | Dinan et al. | |
| 5,119,081 A | 6/1992 | Ikehira | |
| 5,428,722 A | 6/1995 | Marsh et al. | |
| 5,790,708 A | 8/1998 | Delean | |
| 5,835,086 A * | 11/1998 | Bradstreet et al. | 345/581 |
| 5,907,640 A | 5/1999 | Delean | |
| 6,025,927 A | 2/2000 | Honma | |
| 6,046,753 A * | 4/2000 | Searby et al. | 345/537 |
| 6,317,142 B1 * | 11/2001 | Decoste et al. | 715/762 |
| 6,434,269 B1 * | 8/2002 | Hamburg | 382/163 |
| 6,496,598 B1 | 12/2002 | Harman | |
| 7,034,791 B1 | 4/2006 | Odom | |
| 7,551,203 B2 | 6/2009 | Nakayama et al. | |
| 7,623,152 B1 | 11/2009 | Kaplinsky | |
| 2003/0151671 A1 | 8/2003 | Kubota et al. | |
| 2004/0101206 A1 * | 5/2004 | Morimoto et al. | 382/254 |
| 2005/0078192 A1 | 4/2005 | Sakurai et al. | |
| 2005/0125368 A1 | 6/2005 | Akahori | |
| 2005/0162671 A1 | 7/2005 | Illmann | |
| 2006/0011724 A1 | 1/2006 | Joseph et al. | |
| 2006/0059426 A1 | 3/2006 | Ogikubo | |
| 2006/0115176 A1 | 6/2006 | Kanamori et al. | |

(Continued)

FOREIGN PATENT DOCUMENTS

| | | |
|---|---|---|
| JP | 2005-006048 | 1/2005 |
| JP | 2009-146190 | 7/2009 |

OTHER PUBLICATIONS

Haeck, "Tip #2: How to draw anti-aliased circles and disks", http://www.simdesign.nl/tips/tip002.html and DrawCirclesMain.pas, Oct. 21, 2003.*

(Continued)

*Primary Examiner* — Jeffrey Chow
(74) *Attorney, Agent, or Firm* — Schwegman, Lundberg & Woessner, P.A.

(57) ABSTRACT

Methods, systems and computer program products are disclosed for displaying a preview of pixels to be effected by a brush tip area. Input is received for specifying one or more parameters defining a brush tip area. The one or more parameters include a size of the brush tip area. Pixels associated with a canvas in a display window are scanned. The scanned pixels are mapped back into the brush tip area according to a specified transform. A shape of a brush tip taper is calculated to indicate a softness or hardness of an edge of the brush tip area. An output color is composited to the scanned pixels based on the calculated shape of the brush tip taper. A preview representation is displayed of pixels effected by the brush tip area based on the compositing.

27 Claims, 8 Drawing Sheets

U.S. PATENT DOCUMENTS

| | | | |
|---|---|---|---|
| 2006/0133690 | A1 | 6/2006 | Bloomberg et al. |
| 2007/0121141 | A1* | 5/2007 | Takabayashi et al. ......... 358/1.9 |
| 2007/0196028 | A1* | 8/2007 | Kokemohr et al. ........... 382/254 |
| 2007/0216684 | A1* | 9/2007 | Hsu .............................. 345/441 |
| 2007/0268304 | A1* | 11/2007 | Hsu .............................. 345/592 |
| 2008/0196076 | A1 | 8/2008 | Shatz et al. |
| 2009/0160969 | A1 | 6/2009 | Kuroiwa |
| 2009/0285547 | A2 | 11/2009 | Ichihashi et al. |

OTHER PUBLICATIONS

Arah, Tom, Designer-Info.com, Expert Reviews & Articles/Tutorials on Publishing, Vector Drawing, Bitmap Editing, Web Design & 3D software, "Macromedia xRes 2," [Online], [retrieved Jul. 20, 2006].

Battelle, John. Wired Magazine, "The Next Big Thing: Live Picture," Issue 1.04, Sep./Oct. 1993. [Online], [retrieved Jul. 20, 2006] Retrieved from the Internet: <URL:http://www.wired.com/wired/archive/1.04/eword.html?pg=7>.

Fernandez, I.G., Catedratica del Area de Arquitectura y Tecnologia de Computadores Universidad de Almeria, "Multiprocessor systems: Applications to image and video processing and optimization," SMAPIVO TIC2002-00228. Jornada de Seguimiento de Proyectos, 2004 (8 pages).

Live Picture 2.0 v. PhotoShop 3.0, "One of Philip's Friends Who Can't Afford to Annoy LivePicture" [Online], [retrieved Jul. 20, 2006] Retrieved from the Internet: <URL:http://philip.greenspun.com/wtr.live-picture-v-photoshop.html>.

Marshall, Trevor, Byte.com, "HSC's Live Picture features state-of-the-art technologies for enabling high-end image editing on the Power Mac," Jan. 1995 [Online], [retrieved Jul. 20, 2006] Retrieved from the Internet: <URL:http://www.byte.com/art/9501/sec12/art2.htm>.

Seybold Publications, "Conclusion," Seybold Report on Desktop Publishing, vol. 9, No. 1. [Online], [retrieved Jul. 20, 2006] Retrieved from the Internet: <URL:http://www.seyboldreports.com/SRDP/0dp9/D0901004.HTM>.

Seybold Publications, "FITS's Live Picture Image Editor: Well Worth the Wait," Seybold Report on Desktop Publishing, vol. 9, No. 1. [Online], [retrieved Jul. 20, 2006] Retrieved from the Internet: <URL:http://www.seyboldreports.com/SRDP/0dp9/D0901000.HTM>.

Xres TechNote, "xRes 3.0 Overview," Macromedia, Inc. 1997 (3 pages).

* cited by examiner

PREVIEW REPRESENTATION OF PIXELS EFFECTED BY A BRUSH TIP AREA

BACKGROUND

This application relates to digital imagery.

A graphics application may be implemented to edit various graphics documents such as images and videos. When editing the graphics documents, a brush tip tool can be used to change the color of desired pixels. These programs display only outlines of a thresholded grayscale valued brush tip area, and thus it may be difficult to accurately indicate which image pixels will be edited upon brush execution (e.g., mouse-down), or to what extent. In addition, programs that enable inplace brush tip resizing use a rubberbanding circle to indicate a change in brush tip size.

In computer graphics, rubberbanding technique refers to a form of positioning feedback. For example, the brush tip area is initially represented by a circular shape. When resizing the circular brush tip, a user specifies two end points, a starting point for the current circular shape and an ending point for the resized circular shape. As the user moves from the first endpoint (starting point) to the second (ending point), a temporary or "in transit" circular shape is displayed from the starting point to the end point (the current cursor position). In this manner, the user can see the location and size of the circular shape before finishing the positioning. On a computer screen, the effect is that of an elastic or "rubberband" shape that stretches to change size between the first endpoint and the cursor as the cursor is moved relative to the first endpoint.

SUMMARY

This specification describes technologies relating to preview representations of pixels effected by a brush tip.

In general, one aspect of the subject matter described in this specification can be embodied in methods that include the actions of receiving input specifying one or more parameters defining a brush tip area. The one or more parameters include a size of the brush tip area. Pixels associated with a canvas in a display window are scanned. The scanned pixels are mapped back into the brush tip area according to a specified transform. A shape of a brush tip taper is calculated to indicate softness or hardness of an edge of the brush tip area. An output color is composited to the scanned pixels based on the calculated shape of the brush tip taper. A preview representation is displayed of pixels effected by the brush tip area based on the compositing. Other embodiments of this aspect include corresponding systems, apparatus, and computer program products.

These and other embodiments can optionally include one or more of the following features. For each mapped pixel, a distance is calculated between the mapped pixel and a center of the brush tip area. The calculated distance is adjusted to incorporate a selected hardness of the brush tip area. The shape of a brush tip taper is calculated using the calculated distance and a selected brush tip taper. In addition, a location of the brush tip area is detected over the canvas in the display window. Mapping the scanned pixels can include generating a vector from the identified location of the brush tip area to each scanned pixel. Also, mapping the scanned pixels can include rotating the generated vector by a selected brush angle. In addition, mapping the scanned pixels can include scaling the rotated vector by a selected scale factor. Adjusting the calculated distance can include calculating a reciprocal function to soften an edge of the brush tip area based on a selected brush hardness value; and clamping the brush tip hardness value to a range from the center of the brush tip area to a detected radius of the brush tip area.

Calculating the shape of the brush tip taper can include calculating the shape of the brush tip taper using the adjusted distance. Also, calculating the shape of the brush tip taper can include generating an anti-alias mask based on the radius of the brush tip area and the scaled vector. Calculating the shape of the brush tip taper can include combining the anti-alias mask with the calculated shape to prevent coloring of pixels outside the brush tip area with a selected brush color; and anti-aliasing an edge of the brush tip area. Compositing the output color can include obtaining a source image color for each scanned pixel; and blending an output color for the brush tip area based on a selected brush color and obtained source image pixel color. In some implementations, an input can be received specifying a change to the size of the brush tip. In response to the received input specifying the change, modifying the displayed preview representation. Further, compositing the output color can be performed using a graphics processing unit different from a central processing unit to calculate the pixel values.

In another aspect, a computer program product, tangibly stored on a computer readable medium for generating a preview representation of pixels effected by a brush tip area. The computer program product includes instructions operable to cause a data processing apparatus to perform the techniques described in this specification.

In another aspect, the techniques described in this specification can be implemented as a system for displaying a preview representation of pixels effected by a brush tip area. The system includes a user input device to receive input specifying one or more parameters defining a brush tip area. The one or more parameters include a size of the brush tip. Also, the system includes a computer system that includes a central processing unit, a graphics processing unit coupled to the central processing unit and a display unit coupled to the graphics processing unit. Among others, the graphics processing unit is configured to scan pixels associated with a canvas in a display window and transform the scanned pixels to map the scanned pixels back into the brush tip area. Also, the graphics processing unit is configured to calculate a shape of a brush tip taper to indicate softness or hardness of an edge of the brush tip area; and composite an output color to the scanned pixels based on the calculated shape of the brush tip taper. The display unit is configured to display a preview representation of pixels effected by the brush tip area based on the composited output color.

The subject matter described in this specification can be implemented as a method or as a system or using computer program products, tangibly embodied in information carriers, such as a CD-ROM, a DVD-ROM, a semiconductor memory, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various data processing devices.

Particular embodiments of the subject matter described in this specification can be implemented to realize one or more of the following advantages. A shader application is implemented to display a preview representation of pixels effected by a brush tip. The shader application can use parameters of the brush tip e.g., a softness, a diameter, filter type, an angle, and an aspect ratio when computing the preview representation. The shader application may additionally use a source image color (such as solid color, pattern, clone) and transfer mode to provide a more accurate preview of what would happen if the user clicked with the current editing tool on the canvas.

Further, the shader application can be a graphics processing unit (GPU) based application that calculates the pixel values for the brush tip to avoid excessive computations and uploads from a central processing unit (CPU). Such GPU based shader application may enable a more accurate preview presentation and faster interaction even for large brush tips that effect all pixels of a monitor.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference symbols and designations in the various drawings indicate like elements.

DETAILED DESCRIPTION

Techniques and systems are described for displaying a preview representation of pixels to be effected by a brush tip area. The term "brush tip" is used in this specification to describe any type of drawing tool. Thus, a "paint brush" tool will have a brush tip and a "pencil" tool will also have a brush tip. In addition, a brush tip can represent a "drawing edge" of a particular drawing tool used by a user. For example, a paint brush's "brush" represents the bristles of the paint brush while a pencil tool's brush represents the pencil's tip.

A brush tip can be customized by changing the parameters of the brush tip. For example, the shape or size of the brush tip can be modified. With respect to a pencil tool, the brush tip size can be modified to implement, e.g., a dull pencil point or a sharp pencil point. Similarly, a shape of a calligraphy pen is different than a tip of a magic marker or a highlighting pen.

A system for generating digital imagery has a user interface that can be used to receive information from user input. The user interface includes an input device, for example, a stylus or a mouse, which can be used to select a brush and a number of parameters to be used for the brush stroke generated by the brush. Alternatively, the system can receive the information from an application, for example, a computer program. The information received from the application can describe default parameters that define the brush tip.

FIGS. 1A, 1B, 1C, 1D, and 1E show an example of a process 100 for displaying a preview representation of pixels on a canvas to be effected by a brush tip area. A canvas is a displayable workspace on a display window on which a user can open a graphics document, edit the opened image document, and display the edited image document. In some implementations, the size of the graphics document is modified by changing the size of the canvas.

Figure 1A:
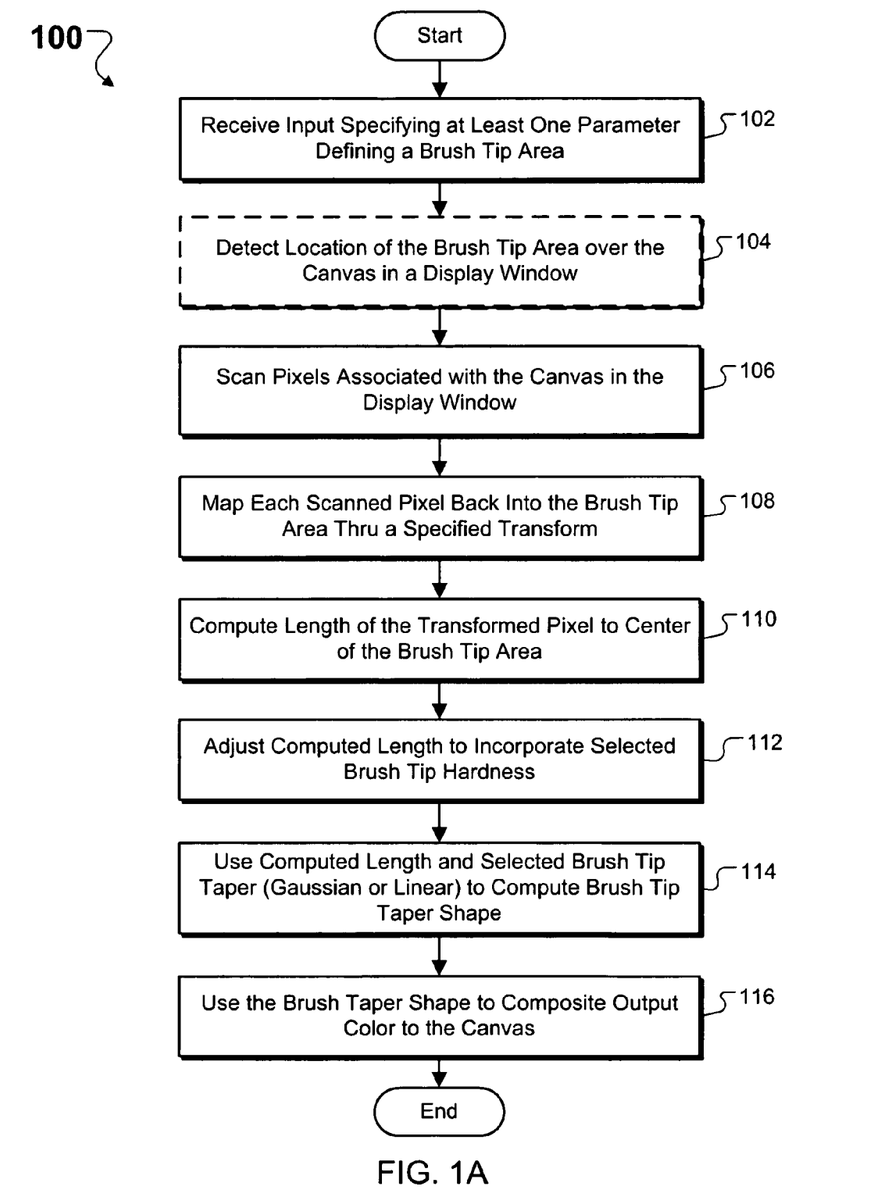
FIGS. 1A, 1B, 1C, 1D, and 1E show an example of a process for displaying a preview representation of pixels on a canvas to be effected by a brush tip area.

For convenience, the process 100 will be described with respect to a system that performs the process 100. The system receives an input specifying at least one parameter defining a brush tip area (102). For example, the parameters that define the brush tip area include a size, brush tip hardness, a color, brush tip taper, etc.

The system detects a location of the defined brush tip area over the canvas in a display window (104). For a two-dimensional canvas, the system detects the location of the defined brush tip area based on the x-coordinate and y-coordinate of the cursor over the canvas. The system scans pixels associated with the canvas on a display window (106). For example, the system can raster scan the pixels on the canvas of the display window line-by-line. The system maps each scanned pixel back into the brush tip area through a specified transform (108). The transform includes affine transformation and projective transformation, for example. Mapping the scanned pixels is described in greater detail below with respect to FIG. 1B.

The system determines (e.g. through computation or calculation) a length or distance for each mapped pixel (e.g., through a specified transform) from the pixel to the center of the brush tip area (110). The system adjusts the determined length to incorporate a selected brush tip hardness or softness (112). Adjusting the length to incorporate a selected brush tip hardness or softness is described in greater detail below with respect to FIG. 1C. In addition, the system uses the determined length and a selected brush tip taper (Gaussian or linear) to compute a shape of the brush tip taper (114). Computing the shape of the brush tip taper is described in greater detail below with respect to FIG. 1D. The system uses the brush tip taper shape to composite the brush color to the pixels on the canvas (116).

The system scans each pixel on the canvas of the display window using raster scanning for example. In addition, the system uses the determined length or distance to determine whether the pixel is outside of the brush tip area or within the brush tip area. When the determined length indicates that the pixel is outside of the brush tip area, then a graphics document displayed on the canvas, including the pixel color of the graphics document, is simply copied and rendered. When the calculated length indicates that the pixel is within the brush tip area, the system blends the graphics document displayed on the canvas with some amount of a selected brush color as described below with respect to FIG. 1E.

The system uses the calculated length to identify the relationship of each pixel with respect to the brush tip area. In some implementations, the input specifying the at least one parameter defining the brush tip area includes the size and shape of the brush tip area. For example, the input can specify that the selected shape of the brush tip area is a circle with a radius "r". Based on the radius, the system compares the calculated distance or length against the selected radius to determine whether the pixel is outside or within the brush tip area. In addition, the system can detect the location of the brush tip area relative to the canvas, and based on the location, the system can use the calculated length as described above.

Figure 1B:
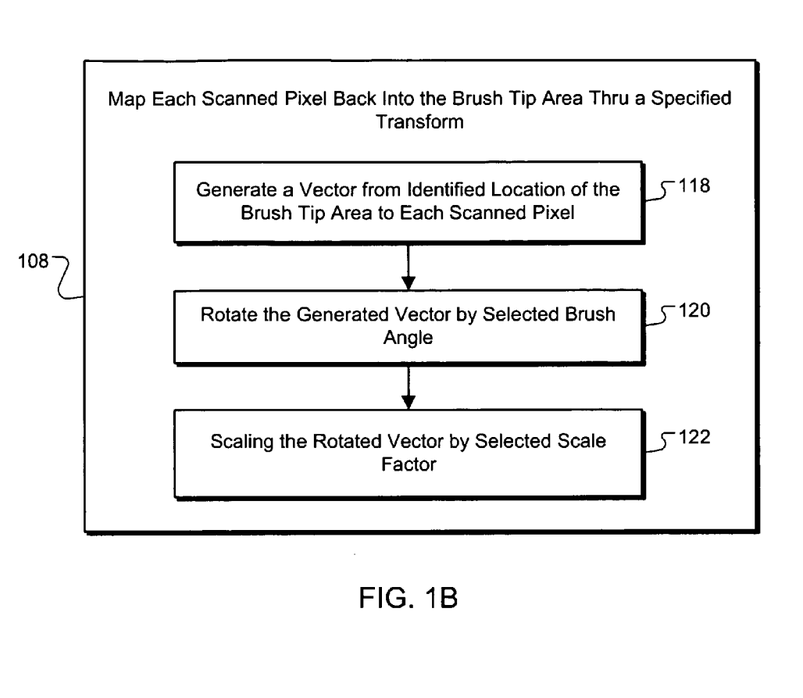

FIG. 1B shows an example process for mapping each scanned pixel back into the brush tip area through a specified transform (108). The system processes the scanned pixels through a specified transform by generating a vector from the location of the brush tip area to each scanned pixel (118).

Scanning the pixels can include various techniques for raster scanning the pixels. The system rotates the generated vector by a selected brush angle (120). The brush angle is an input parameter with a default value assigned for each brush tip type. In addition, the user can change the brush angle. The system scales the rotated vector by a selected scale factor (122). The selected scale factor is another input parameter with a default value assigned for each brush tip type. In addition, the user can change the selected scale factor.

Figure 1C:
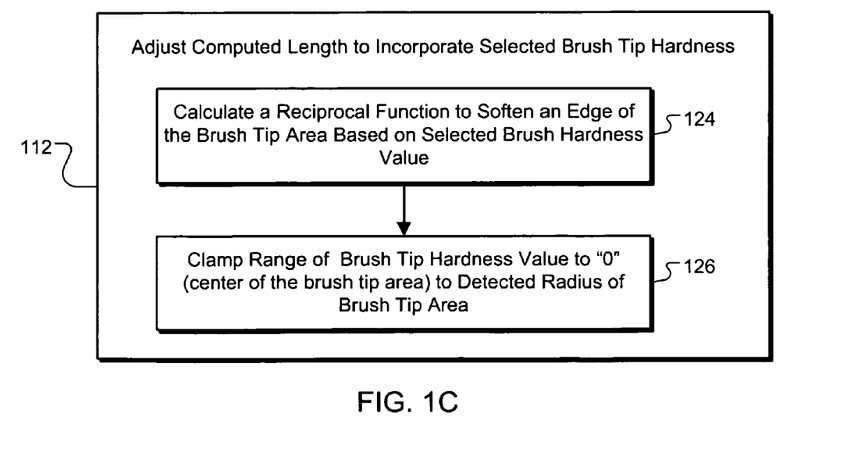

FIG. 1C shows an example process for adjusting the length for each mapped pixel (using a selected transform) from the pixel to the center of the brush tip area (112). The adjustment process is designed to incorporate a selected brush tip hardness or softness. To adjust the computed length or distance, the system calculates a reciprocal function to soften an edge of the brush tip area based on a selected brush tip hardness or softness value (124). The selected brush tip hardness or softness value is another input parameter with a default value assigned for each brush tip type. In some implementations, the user changes the brush tip hardness or softness value. In addition, the range of the brush tip hardness value can be clamped or limited to "0" (center of the brush tip area) to a detected radius of the brush tip area (126).

Figure 1D:
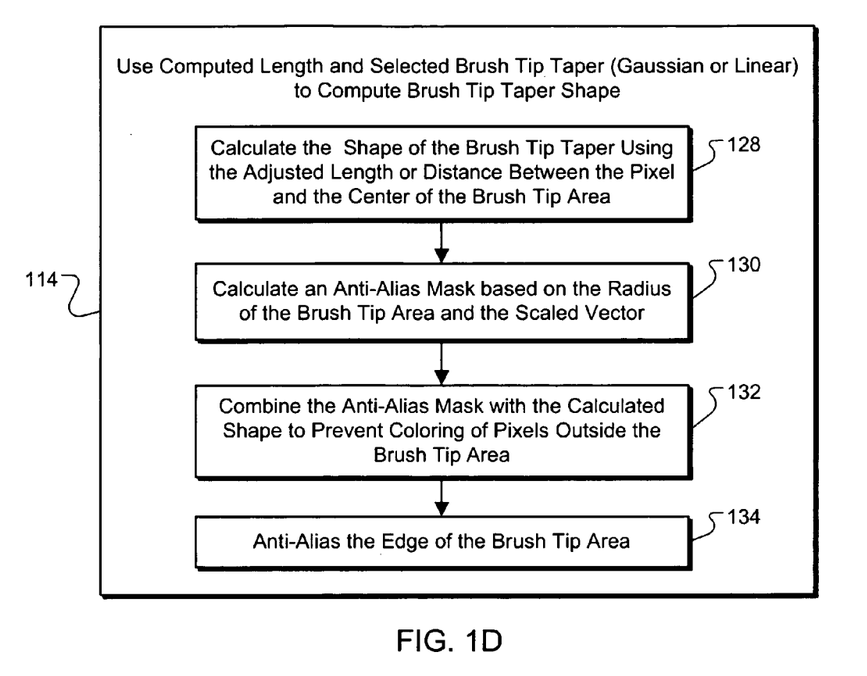

FIG. 1D shows an example process for using the calculated length or distance from the pixel to the center of the brush tip area and a selected brush tip taper to determine (e.g., by computation or calculation) a brush tip taper shape (114). The selected brush tip taper can be based, for example, on either a Gaussian or linear falloff. The selected brush tip taper is another input parameter with a default value assigned for each brush tip type. In addition, the user can change the brush tip taper.

The system calculates a shape of the brush tip area using the adjusted length or distance for each mapped pixel (e.g., based on a specified transformation) from the mapped pixel to the center of the brush tip area (128). In addition, the system calculates an anti-alias mask based on the radius of the brush tip area and the scaled vector (130). The system combines the calculated anti-alias mask with the calculated shape of the brush tip taper to prevent coloring of pixels located outside of the brush tip area (132). Thus, the system provides an anti-aliased cutoff for pixels outside the brush tip area perimeter. Further, the system can anti-alias the edge of the brush tip area (134). In some implementation, an anti-aliased outer brush edge is implemented even when the selected brush tip hardness is 100%.

In addition, the system can represent a brush tip shape value using a curve plotted on a grid where Y=blend (0=image, 1=brush color) and x=distance of the current pixel from the brush tip area. For a typical Gaussian brush tip area, the function is represented by half a bell curve with a long zero tail to the right and a value of 1 at x=0 (at the brush tip area center). The brush tip taper refers to the shape of this curve from x=0 (center of the brush tip) out to the point on the grid where the Y value reaches zero. Pixels outside of the brush tip area are not colored. Instead, the source image color is copied from the graphics document (i.e., the pixel color corresponds to the source image color for those pixels outside the brush tip area).

Figure 1E:
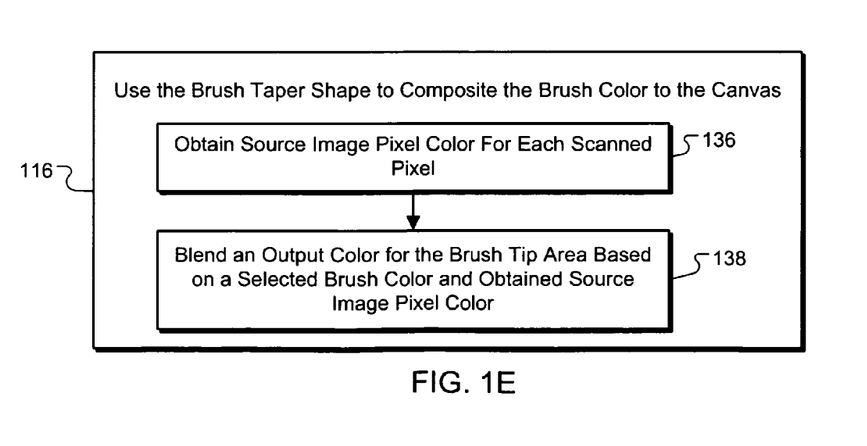

FIG. 1E shows an example process for using the calculated brush tip taper shape to composite a selected brush color to the pixels on the canvas (116). The system obtains a source image pixel color for each scanned pixel (136). The system blends an output color for the brush tip area based on the selected brush color and the obtained source image pixel color (138).

The blending process can be implemented to output the source image color or a blended image-brush color for every raster pixel on the canvas. In addition, the blending process may be controlled by a 'disc' value, that is a function of the user brush type Gaussian/Linear, brush hardness, and brush diameter. The function can be visualized as a curve plotted on a grid where Y=blend (0=image, 1=brush color) and x=distance of the current pixel from the brush tip. For a typical Gaussian brush tip, the function is represented by half a bell curve with a long zero tail to the right and a value of 1 at x=0 (at the brush tip area center).

The system identifies one or more of the pixels on the canvas to be part of the brush tip area based on the computed 'disc' shape associated with the brush tip area. The value is set to zero for all pixels on the canvas outside the brush tip area and between 0 and 1 for the brush tip tapered perimeter. The value is set to 1 (representing a solid color) for the very center of the brush tip.

Parameters that define the brush tip area can include parameters that affect the color, shape, texture, etc. The system can incorporate these parameters by enabling a user to select from various pre-generated brush tips having different sizes, colors, angles, and shapes of brush tips. In addition, the user can select or adjust one or more of these parameters directly.

A graphical user interface (GUI) can be displayed to enable a user to select from various brush tip parameters, for example, brush tip types, brush tip taper, brush size, and brush color. In addition, GUI can enable the user to change one or more brush tip parameters. While each available brush tip type can include default brush tip parameters (e.g., tip taper, size, color), these default brush tip parameters can be changed by the user. For example, the GUI can include one or more menus that enable a user selection of the brush tip parameters, e.g., tip types, brush tip taper, size, and color. Alternatively, the GUI can include one or more of user selectable objects, for example, buttons, tabs, radio buttons, drop-down lists, pop-up windows, and combinations. In some implementations, the GUI includes a combination of the menus and user selectable objects.

Figure 2A:
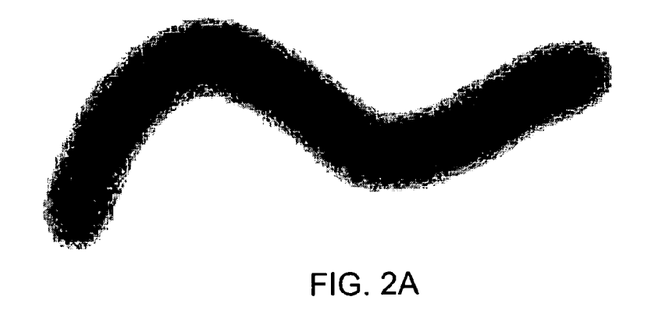
FIGS. 2A, 2B, and 2C show example brush strokes representing example brush tip parameters.
Figure 2B:
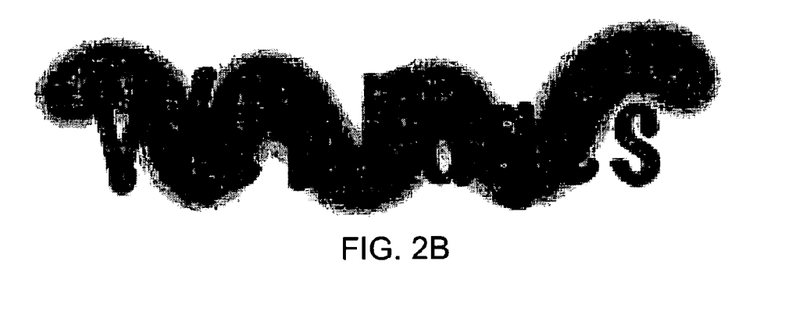
Figure 2C:
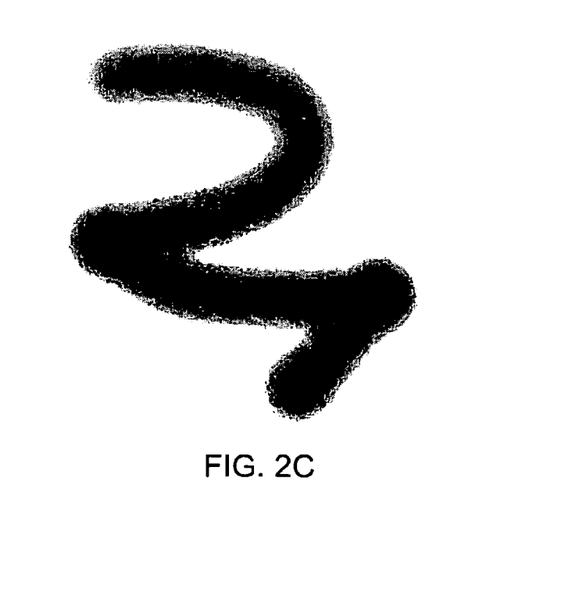

FIGS. 2A, 2B, and 2C show example brush strokes representing example brush tip parameters. The available brush tip parameters can include a shape dynamics parameter that enables a user to change the shape of a selected brush tip. For example, the brush tip shape can include a geometric shape e.g., a circle, an ellipse, or a non-geometric shape. A texture parameter can allow a user to vary the opacity of a brush, based on a texture for the graphics document on the pixel canvas onto which the brush tip is to be applied. Yet another available brush tip parameter includes a color dynamics parameter that enables a user to vary the color of the selected brush tip brush stroke.

FIG. 2A shows an example brush stroke representing an example effect of a noise parameter. A noise parameter may enable a user to add a "noisy" look to brushes having soft edges. FIG. 2B shows an example brush stroke representing an example effect of a wet edge parameter. A wet edge parameter can enable a user to reduce the opacity in the center of a brush stroke and increases the opacity towards the edges of the brush. FIG. 2C shows an example brush stroke representing an example effect of an airbrush parameter. An airbrush can cause paint to build up when the user stops moving a paint brush, just as it would if the user held a can of spray paint in one position. A smoothing parameter enables a user to smooth a brush stroke. Further, other brush tip parameters can be implemented to enable a user to change other settings that are not affected by the previously described brush presets.

The available parameters that a user can change differ depending on which brush presets are selected. This makes it possible to have a clean user interface that is easy to understand and that does not take up too much of the available space on a user's computer screen.

Figure 3A:
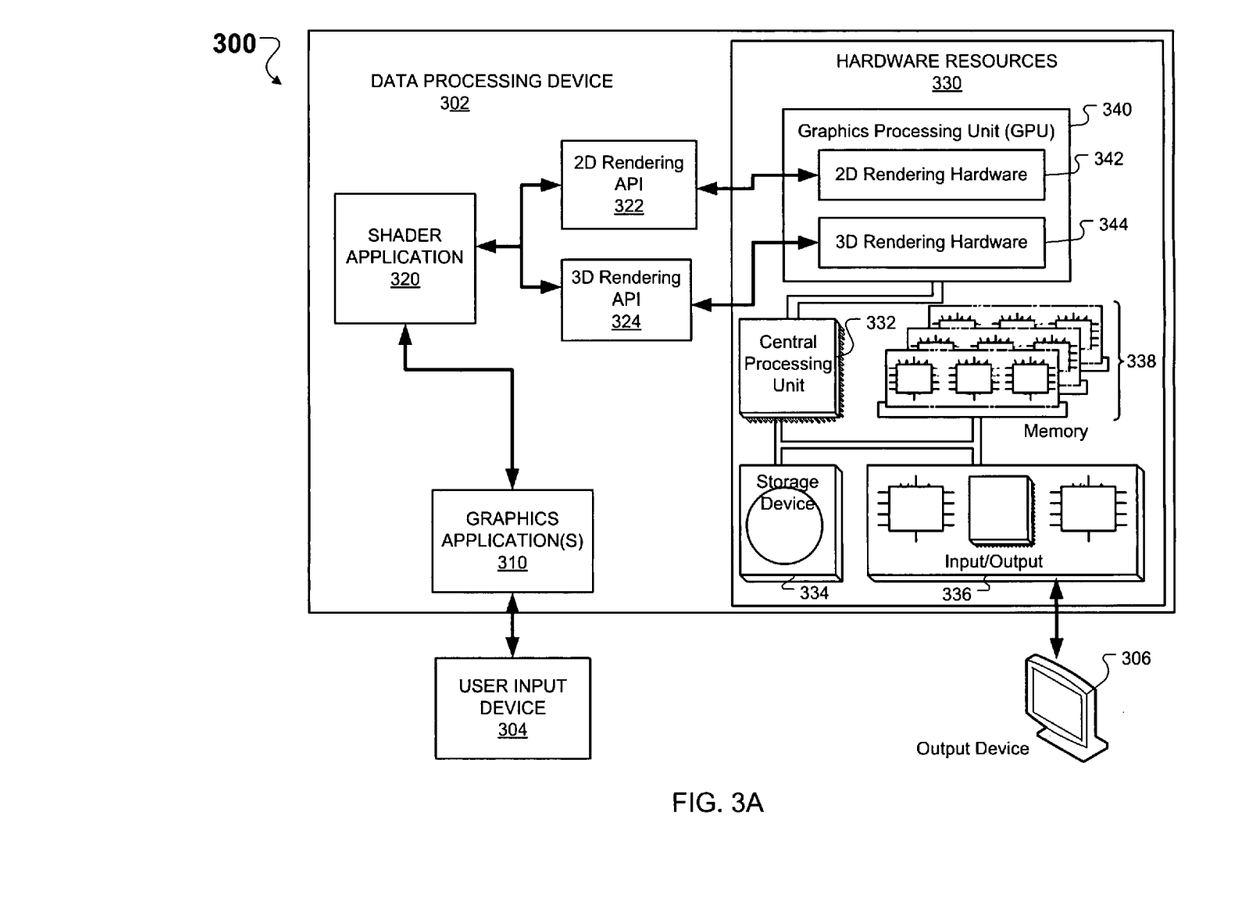
FIG. 3A shows an example system for displaying a preview representation of pixels to be effected by a brush tip area.

FIG. 3A shows an example system 200 for displaying a preview representation of pixels to be effected by a brush tip area. The processes described with respect to FIGS. 1A, 1B, 1C, 1D, and 1E can be performed by system 300. The system 300 includes one or more data processing devices 302 connected to an input device 304 and an output device 306. The input device 304 is used to receive input from a user, for example. The received input is processed by the data processing device 302, and an output signal is sent to the output device 306 based on the processed input.

The input device 304 includes various devices designed to receive the input from the user. For example, the input device 304 can include a keyboard, a mouse, a trackball, a joystick, a motion or position sensor e.g., an accelerometer or gyroscope, a touch sensor, a pressure sensor, etc.

The output device 306 includes various devices designed to receive an output signal and display the received output signal. The output device 306 can include a display device e.g., a liquid crystal display (LCD) device, a light emitting diode (LED) display device, a cathode fluorescence lamp (CFL) display device, etc. The output device 306 can also include other output devices e.g., a printer.

The data processing device 302 includes various hardware resources, for example, a central processing unit (CPU) 332, a memory unit 338, a storage device 334, an input/output module 336 and a graphics processing unit (GPU) 240. The GPU can include a 2-dimenstional (2D) rendering hardware 342 and a 3-dimensional (3D) rendering hardware 344. The storage device 334 includes one or more volatile memory devices. The volatile memory devices include one or more computer or machine-readable media, for example, a hard drive, a compact disc read only memory (ROM), a compact flash drive. Memory 338 includes one or more non-volatile memory devices. The non-volatile memory devices can include various types of random access memory (RAM) including single density RAM (SDRAM), video RAM (VRAM), dual density RAM (DDRAM), etc.

The data processing device 302 can be designed to operate one or more selected applications including a graphics application 310. For example, the graphics application 310 can include a media editor that edits various types of media including images, videos, graphics, texts, etc. The graphics application 310 operating on the data processing device 302 can receive input from a user through the input device 304. Based on the received user input, the graphics application can perform various operations including calling on the hardware resources 330 to execute an associated application to display a desired output, for example.

The associated application can include a shader application 320 that performs the processes described with respect to FIGS. 1A, 1B, 1C, 1D, and 1E. The shader application 320 can include a set of software instructions used by the available graphic resources to perform, for example, 2-dimensional (2D) or 3-dimensional (3D) rendering effects. The shader application 320 can be used to enable a 3D application designer to program a GPU programmable pipeline to take advantage of the flexibility in making use of advanced GPU programmability features, for example.

The GPU 340 can execute the shader application 320 per pixel output. By offloading expensive (with respect to processing costs) computations to the GPU 340, a greater interaction with the user can be provided regardless of brush size.

In addition, the CPU 332 can be freed to perform other tasks. This enables improved performance of the data processing device 302. The shader application 320 can use e.g., a softness, a diameter, filter type, an angle, and/or an aspect ratio, of the brush tip when computing the preview. The shader application 320 can additionally take into consideration the current paint source (e.g., solid color, pattern, clone), and transfer mode to provide a more accurate preview of what would happen if the user clicked with the current tool on the canvas.

To interface with the GPU 340, the shader application 320 may access one or more application program interfaces (APIs) 322 and 324. For example, a 2D rendering API 322 can be used to interface with the 2D rendering hardware and/or a 3D rendering API 324 can be used to interface with the 3D rendering hardware.

Figure 3B:
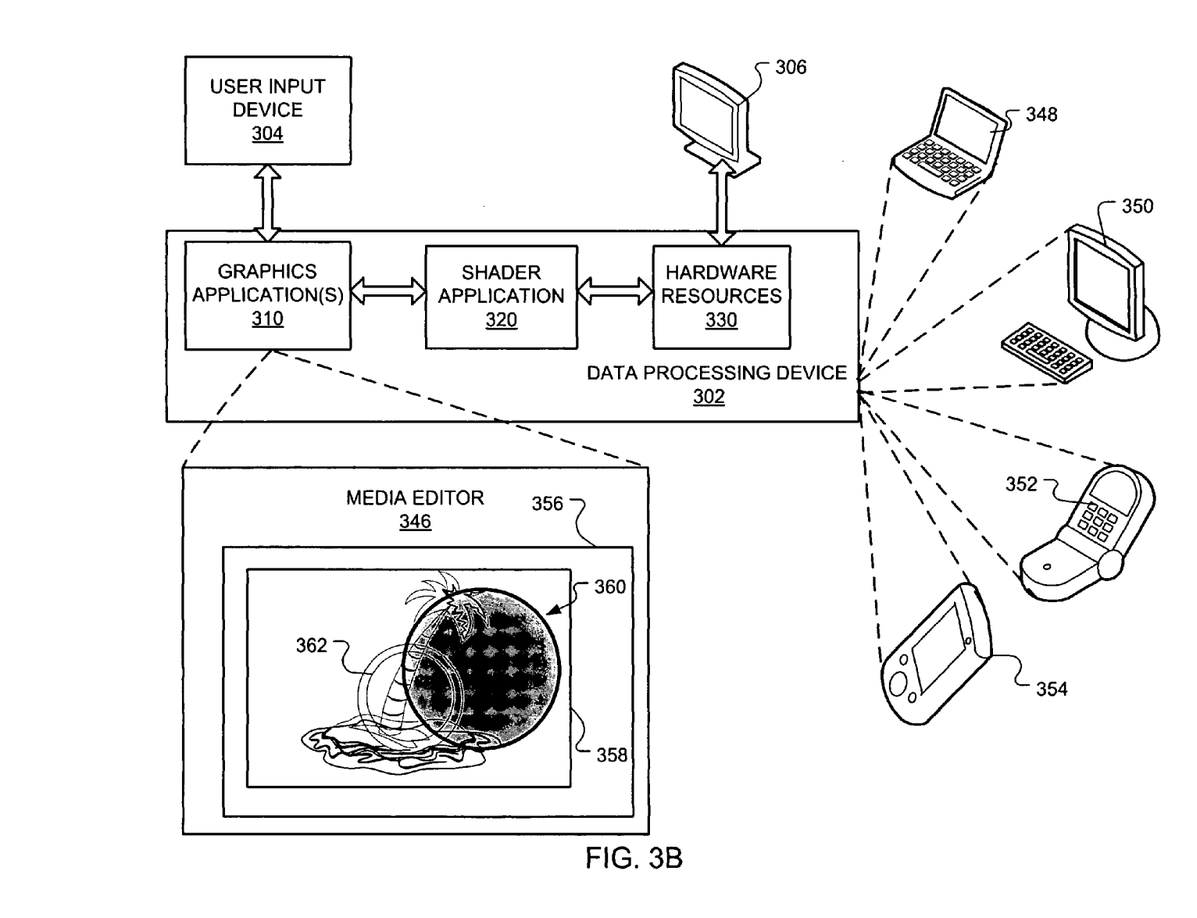
FIG. 3B shows another example system for displaying a preview representation of pixels effected by a brush tip area.

FIG. 3B shows another example of the system 300 for displaying a preview representation of pixels effected by a brush tip area. The data processing device 302 can include various devices including a tethered desktop computer 350, a portable or mobile computing device 348 e.g., a laptop computer, a handheld device 352 e.g., a smart phone, and a personal digital assistant (PDA) 354.

In FIG. 3B, an example graphics application 310 is shown to include a media editor 346. An example media editor includes Adobe® Photoshop®. The media editor 346 can be designed to edit and display one or more graphics documents. The edited graphics document is displayed in a display window 356 of, for example the output device 306 and data processing devices 302. The display region of the display window 356 includes a canvas 358 for editing the graphics document. For example, a visual representation of a graphics document 362 is shown in FIG. 3B. In addition, a preview representation 360 of pixels on the canvas to be effected by a brush tip is shown. The pixels to be effected by the brush tip represent the brush area or region. In the example shown in FIG. 3B, the preview representation 360 of the effected pixels is shown as a circle. In some implementations, alternative shapes e.g., an ellipse or other geometric or non-geometric shapes, are used.

Figure 4A:
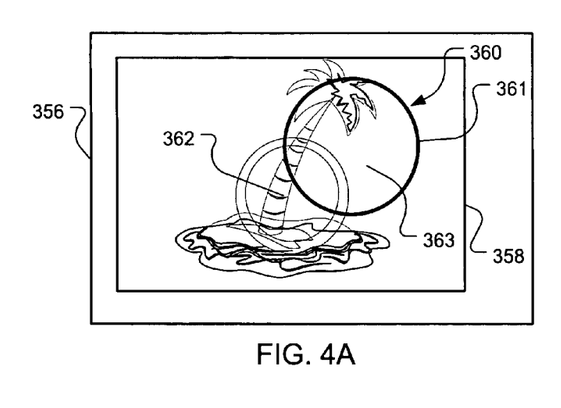
FIGS. 4A, 4B, 4C, 4D, and 4E show examples of preview representation of pixels to be effected by a brush tip area.

FIGS. 4A, 4B, 4C, 4D, and 4E show examples preview representations of pixels to be effected by a brush tip area. FIG. 4A shows a display window 356 that includes a display canvas 358 for editing a document. For example, a visual representation of a graphics document 362 is shown in FIG. 4A. In addition, in the example shown in FIG. 4A, a representation 360 of a selected brush tip area is shown as a circular shape. The representation 360 includes a border 361 that visually indicates the limit of the brush tip area 363. When a brush tip type is selected, a default size may be used to indicate the brush tip area 363 in the representation 360.

Figure 4B:
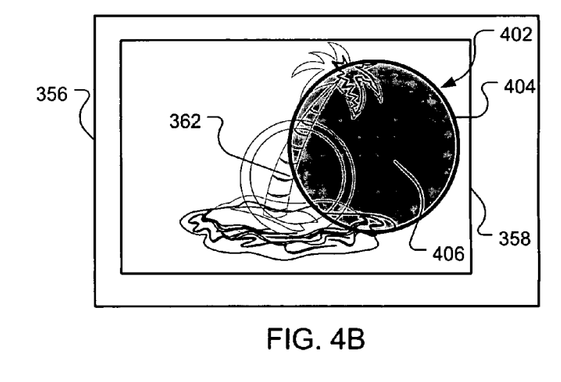

FIG. 4B shows an example preview representation 402 of the brush tip area that includes a border 404 when the default size as shown in FIG. 4A is modified, by the user for example. The user can change the size of the brush tip area 406 by a 'click-and-drag' action or by interfacing with a user selectable element. When the size of the brush tip area 406 is being modified, the preview representation 402 of the brush tip area 406 changes to show a preview shape indicative of the changed size. In addition, the brush tip area 406 is rendered to indicate which pixels will be effected by the brush tip. Each effected pixel is rendered or composited to show a preview blended color that will result when the brush tip is applied to the canvas. In the example shown in FIG. 4B, the brush tip area 406 is increased from the default size shown in FIG. 4A.

Figure 4C:
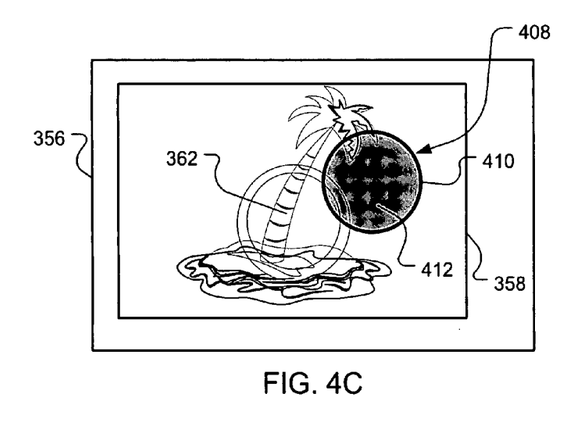

FIG. 4C shows another example preview representation 408 of a brush tip area 412 with a border 410. In the example shown in FIG. 4C, the brush tip area 412 has been reduced from the default size shown in FIG. 4A.

Figure 4D:
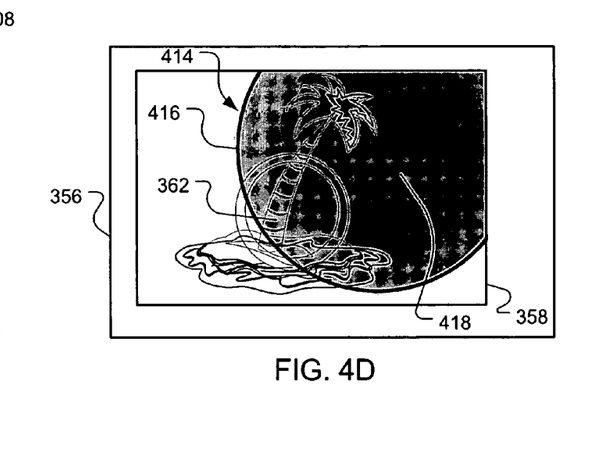

FIG. 4D shows another example preview representation 414 of a brush tip area 418 with a border 416. In the example shown in FIG. 4D, the brush tip area 418 has been increased to a point where nearly all of the pixels on the canvas 458 are effected by the brush tip area. In fact, the brush tip size can be increased to cover all of the pixels on the canvas 458.

Figure 4E:
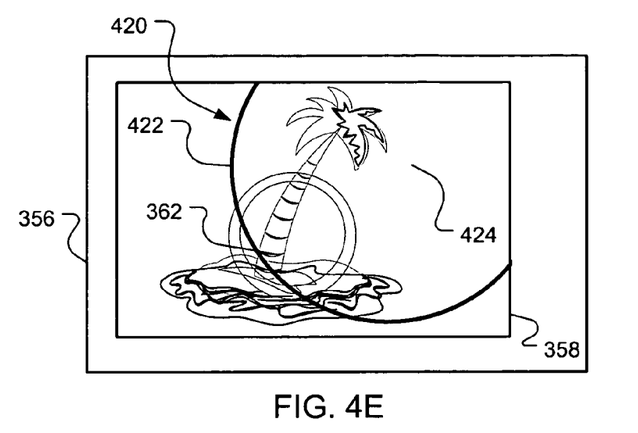

FIG. 4E shows another example preview representation 420 of a brush tip area 424 with a border 422. In this example, modification of the brush tip area 424 has ended to the size shown in FIG. 4D. Once the change in the size of the brush tip area 424 has ended, the preview representation 420 reverts back to displaying the border 422 only with the pixels to be effected by the brush tip area 424 rendered using the source image color. Thus, FIGS. 4A-4E in sequence show an example transition in the size of the brush tip area from the default size to various modified sizes.

Figure 5:
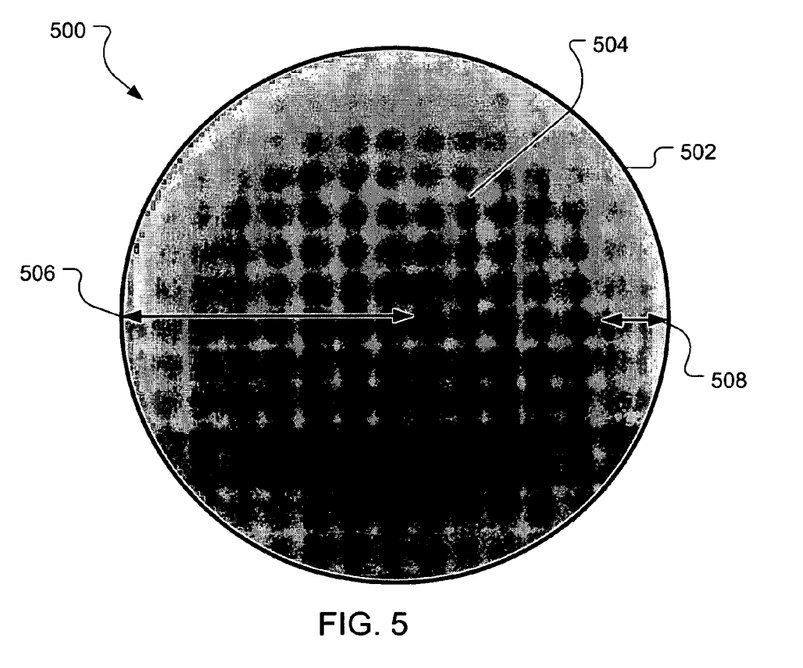
FIG. 5 shows an example of a preview representation of a brush tip area.

FIG. 5 shows an example of a preview representation 500 of a brush tip area 504. The preview representation 500 includes a border 502 of the brush tip area 504. The brush tip area 504 has a radius 506 that changes as the size of the brush tip area 504 changes. Further, an edge 508 of the brush tip area 504 shows a taper based on the selected brush tip hardness and radius of the brush tip area as described with respect to FIGS. 1A-1E. The preview representation 500 shows a preview shape and a taper that indicates which pixels are to be effected and how much 'paint' will be applied when the user actually uses the brush tip tool.

The brush tip taper can be implemented using feathering technique to smooth or blur the edges of the brush tip area. This feathering causes the painted area to appear smooth. In addition, feathering may provide an effect of an airbrush or spray-paint. A selected color is concentrated at the center of the brush tip area, and the color blends out toward the edges.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium or a machine readable medium. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application.

What is claimed is:

1. A machine implemented method, comprising:
   receiving an input specifying one or more parameters defining a brush tip area, wherein the one or more parameters includes a size of the brush tip area;
   detecting a location of the brush tip area over a canvas in a display window based on a cursor position, wherein the canvas provides a displayable workspace;
   scanning pixels associated with the canvas in the display window;
   mapping the scanned pixels back into the brush tip area according to a specified transform;
   calculating a shape of a brush tip taper for mapped pixels within the brush tip area, the shape of the brush tip taper indicating a softness or hardness of an edge of the brush tip area;
   compositing an output color to the scanned pixels based on the calculated shape of the brush tip taper; and
   displaying a preview representation of pixels effected by the brush tip area at the location over the canvas based on the compositing without editing the canvas.

2. The machine implemented method of claim 1, further comprising:
   for each mapped pixel, calculating a distance between the mapped pixel and a center of the brush tip area;
   adjusting the calculated distance to incorporate a selected hardness of the brush tip area; and
   calculating the shape of a brush tip taper using the calculated distance and a selected brush tip taper.

3. The machine implemented method of claim 2, wherein adjusting the calculated distance comprises:
   calculating a reciprocal function to soften an edge of the brush tip area based on a selected brush hardness value; and
   clamping the brush tip hardness value to a range from the center of the brush tip area to a detected radius of the brush tip area.

4. The machine implemented method of claim 2, wherein calculating the shape of the brush tip taper comprises:
   calculating a shape of the brush tip area using the adjusted distance; and
   generating an anti-alias mask based on the radius of the brush tip area and a scaled vector.

5. The machine implemented method of claim 4, wherein calculating the shape of the brush tip taper comprise:
   combining the anti-alias mask with the calculated shape to prevent coloring of pixels outside the brush tip area with a selected brush color; and
   anti-aliasing an edge of the brush tip area.

6. The machine implemented method of claim 1, wherein transforming the scanned pixels comprises:
   generating a vector from the identified location of the brush tip area to each scanned pixel;
   rotating the generated vector by a selected brush angle; and
   scaling the rotated vector by a selected scale factor.

7. The machine implemented method of claim 1, wherein compositing the output color comprises:
   obtaining a source image color for each scanned pixel; and
   blending an output color for the brush tip area based on a selected brush color and obtained source image pixel color.

8. The machine implemented method of claim 1, further comprising:
   receiving an input specifying a change to the size of the brush tip; and
   in response to the received input specifying the change, modifying the displayed preview representation.

9. The machine implemented method of claim 1, wherein compositing the output color comprises:
   compositing the output color using a graphics processing unit different from a central processing unit to calculate the pixel values.

10. A computer program product, tangibly stored on a non-transitory computer readable medium, comprising instructions operable to cause a data processing apparatus to perform operations comprising:
    receiving input specifying one or more parameters defining a brush tip area, wherein the one or more parameters include a size of the brush tip area;
    detecting a location of the brush tip area over a canvas in a display window based on a cursor position, wherein the canvas provides a displayable workspace;
    scanning pixels associated with the canvas in the display window;
    mapping the scanned pixels back into the brush tip area according to a specified transform;
    calculating a shape of a brush tip taper for mapped pixels within the brush tip area, the shape of the brush tip taper indicating a softness or hardness of an edge of the brush tip area;
    compositing an output color to the scanned pixels based on the calculated shape of the brush tip taper; and generating a preview representation of pixels effected by the brush tip area at the location over the canvas based on the compositing without editing the canvas.

11. The computer program product of claim 10, further comprising instructions operable to cause a data processing apparatus to perform operations including:
for each mapped pixel, calculating a distance between the mapped pixel and a center of the brush tip area;
adjusting the calculated distance to incorporate a selected hardness of the brush tip area; and
calculating the shape of a brush tip taper using the calculated distance and a selected brush tip taper.

12. The computer program product of claim 10, wherein transforming the scanned pixels further comprises instructions operable to cause a data processing apparatus to perform operations including:
generating a vector from the identified location of the brush tip area to each scanned pixel;
rotating the generated vector by a selected brush angle; and
scaling the rotated vector by a selected scale factor.

13. The computer program product of claim 11, wherein adjusting the calculated distance further comprising instructions operable to cause a data processing apparatus to perform operations including:
calculating a reciprocal function to soften an edge of the brush tip area based on a selected brush hardness value; and
clamping the brush tip hardness value to a range from the center of the brush tip area to a detected radius of the brush tip area.

14. The computer program product of claim 11, further comprising instructions operable to cause a data processing apparatus to perform operations including:
calculating a shape of the brush tip area using the adjusted distance; and
generating an anti-alias mask based on the radius of the brush tip area and a scaled vector.

15. The computer program product of claim 14, further comprising instructions operable to cause a data processing apparatus to perform operations including:
combining the anti-alias mask with the calculated shape of the brush tip taper to prevent coloring of pixels outside the brush tip area with a selected brush color; and
anti-aliasing an edge of the brush tip area.

16. The computer program product of claim 10, wherein compositing the output color further comprising instructions operable to cause a data processing apparatus to perform operations including:
obtaining a source image color for each scanned pixel; and
blending an output color for the brush tip area based on a selected brush color and obtained source image pixel color.

17. The computer program product of claim 10, further comprising instructions operable to cause a data processing apparatus to perform operations including:
receiving an input specifying a change to the size of the brush tip; and
in response to the received input specifying the change, modifying the displayed preview representation.

18. The computer program product of claim 10, further comprising instructions operable to cause a data processing apparatus to perform operations including:
compositing the output color using a graphics processing unit different from a central processing unit to calculate the pixel values.

19. A system comprising:
a user input device to receive input specifying one or more parameters defining a brush tip area, wherein the one or more parameters include a size of the brush tip; and
a computer system comprising:
a central processing unit;
a graphics processing unit coupled to the central processing unit to
detect a location of the brush tip area over a canvas in a display window based on a cursor position, wherein the canvas provides a displayable workspace;
scan pixels associated with the canvas in the display window;
map the scanned pixels back into the brush tip area according to a specified transform;
calculate a shape of a brush tip taper for mapped pixels within the brush tip area, the shape of the brush tip taper indicating a softness or hardness of an edge of the brush tip area; and
composite an output color to the scanned pixels based on the calculated shape of the brush tip taper; and
a display unit coupled to the graphics processing unit to display a preview representation of pixels effected by the brush tip area at the location over the canvas based on the composited output color without editing the canvas.

20. The system of claim 19, wherein the graphics processing unit is configured to:
for each mapped pixel, calculate a distance between the mapped pixel and a center of the brush tip area;
adjust the calculated distance to incorporate a selected hardness of the brush tip area; and
calculate the shape of a brush tip taper using the calculated distance and a selected brush tip taper.

21. The system of claim 20, wherein the graphics processing unit is configured to adjust the calculated distance comprising:
calculate a reciprocal function to soften an edge of the brush tip area based on a selected brush hardness value; and
clamp the brush tip hardness value to a range from the center of the brush tip area to a detected radius of the brush tip area.

22. The system of claim 20, wherein the graphics processing unit is configured to calculate the shape of the brush tip taper comprising:
calculate a shape of the brush tip area using the adjusted distance; and
generate an anti-alias mask based on the radius of the brush tip area and a scaled vector.

23. The system of claim 22, wherein the graphics processing unit is configured to calculate the shape of the brush tip taper comprising:
combine the anti-alias mask with the calculated shape to prevent coloring of pixels outside the brush tip area with a selected brush color; and
anti-alias an edge of the brush tip area.

24. The system of claim 19, wherein the graphics processing unit is configured to map the scanned pixels comprising:
generate a vector from the identified location of the brush tip area to each scanned pixel;
rotate the generated vector by a selected brush angle; and
scale the rotated vector by a selected scale factor.

25. The system of claim 19, wherein the graphics processing unit is configured to composite the output color comprising:

obtain a source image color for each scanned pixel; and blend an output color for the brush tip area based on a selected brush color and obtained source image pixel color.

26. The system of claim 19, wherein the graphics processing unit is configured to:

receive an input specifying a change to the size of the brush tip; and in response to the received input specifying the change, modify the displayed preview representation.

27. The system of claim 19, wherein the graphics processing unit is configured to composite the output color to calculate the pixel values.

* * * * *